United States Patent [19]
Gravis, III et al.

[11] 3,841,382
[45] Oct. 15, 1974

[54] GLYCOL REGENERATOR USING CONTROLLER GAS STRIPPING UNDER VACUUM

[75] Inventors: Charles K. Gravis, III; Robert A. Hodgson, both of Tulsa, Okla.

[73] Assignee: Maloney-Crawford Tank Corporation, Tulsa, Okla.

[22] Filed: Mar. 16, 1973

[21] Appl. No.: 341,990

[52] U.S. Cl.............. 159/16 R, 159/31, 159/47 R, 55/32, 203/18
[51] Int. Cl...... B01d 1/14, C07c 29/26, B01d 1/00, B01d 53/02
[58] Field of Search............ 159/31, DIG. 16, 16 R, 159/31, 47 R; 55/32; 203/18

[56] References Cited
UNITED STATES PATENTS

| | | |
|---|---|---|
| 3,206,380 | 9/1965 | Daviau............................ 203/11 X |
| 3,214,352 | 10/1965 | Wells.................................. 202/187 |
| 3,233,390 | 2/1966 | Meyers................................ 55/196 |
| 3,370,636 | 2/1968 | Francis, Jr. et al................ 159/31 x |
| 3,397,731 | 8/1968 | Gravis et al......................... 159/16 |
| 3,450,603 | 6/1969 | Meyers et al..................... 159/31 X |
| 3,481,113 | 12/1969 | Burnham, Sr....................... 55/41 |
| 3,648,434 | 3/1972 | Gravis et al......................... 55/32 |

*Primary Examiner*—Jack Sofer
*Attorney, Agent, or Firm*—Head & Johnson

[57] ABSTRACT

This disclosure describes a glycol reconcentrating system which uses a reboiler to remove a major portion of the absorbed water and then exposes the hot lean glycol to a combined counterflow of dry gas and a partial vacuum, to effect the removal of additional amounts of absorbed water.

6 Claims, 1 Drawing Figure

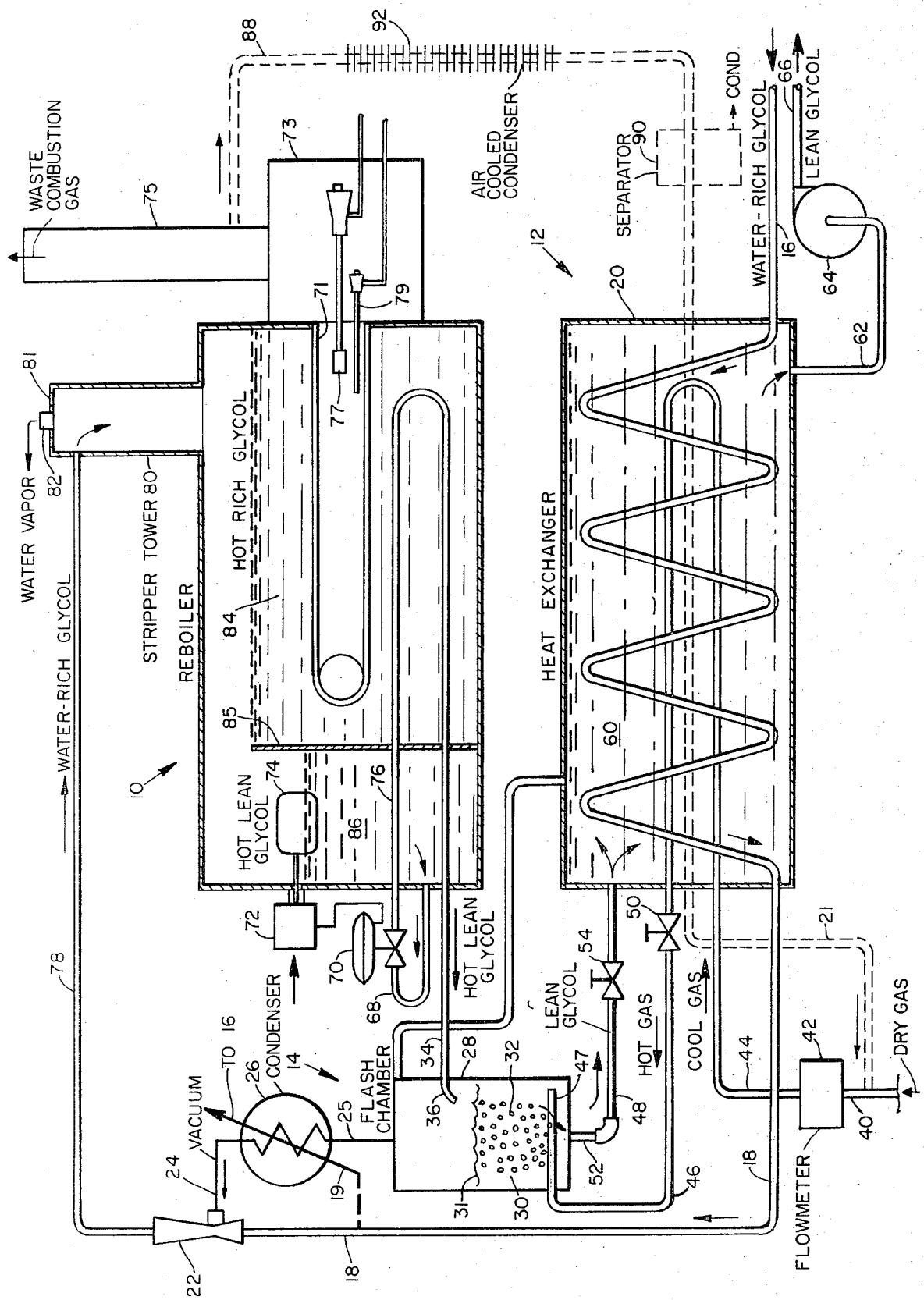

GLYCOL REGENERATOR USING CONTROLLER GAS STRIPPING UNDER VACUUM

CROSS REFERENCE TO RELATED PATENT

This application is related to U.S. Pat. No. 3,397,731, issued Aug. 20, 1968, entitled "METHOD AND APPARATUS FOR RECONCENTRATING LIQUID DESICCANT," assigned to the same assignee as this application.

BACKGROUND OF THE INVENTION

This invention relates to the dehydration of fluids. More particularly, this invention relates to the dehydration of liquids which have previously been employed as desiccants. Still more particularly, this invention relates to the reconcentration of liquid desiccants which have beem employed for the dehydration of gas streams.

Liquid desiccants, such as ethylene glycol, diethylene glycol and triethylene are commonly used for dehydrating natural gas streams. The dehydration occurs by the intimate mixing of the gas stream with the liquid desiccant and the removal of water from the gas stream because of the greater affinity of water for the glycol than for the gas stream. The moisture laden glycol is collected and passed to a distillation zone where the liquid is reboiled or heated above the boiling point of water so that part of the water is driven off and lean glycol is collected to be recycled to the contact zone for drying additional gas. Because of the phase relationships involved, the glycol is never completely free of moisture by distillation along. The economics of the operation usually prevents the complete drying of the glycol by treatment with known dehydrating materials.

This invention was particularly developed for use in reconcentrating glycol and, therefore, the detailed description of the method and system will be related particularly to a glycol drying system for natural gas. However, it will be understood that the invention is useful in any stream treating system employing a liquid absorbent in which the liquid absorbent is normally reconcentrated by vaporizing the solute.

It is well known to dry a natural gas stream by passing it in intimate contact with a liquid desiccant or absorbant such as triethylene or diethylene glycol.

It is also well known that the water dewpoint depression of the gas stream depends, to a great extent, on how lean a solution of the liquid absorbent can be obtained when that solution is reconditioned.

With the conventional reconcentration equipment of the vapor type the absorbent cannot be completely reconcentrated. Conventional methods are dependent upon heat for reconcentration. The temperature to which glycol can be heated without decomposing is limited. Therefore, all water cannot be driven off. A substantial percentage of reconcentration is possible, but heretofore conventional equipment and methods have not approached one hundred percent reconcentration.

These conventional methods and equipment are satisfactory where the temperature of the gas stream to be dried is low, or pressures are high, and relatively small water dewpoint depression of the gas stream will remove the desired amount of water. However, where temperatures are high or pressure are low, there are many instances in which conventional liquid absorbent equipment and methods will not remove a sufficient amount of water. As the gas pipeline companies specify the amount of water permissible in the gas, and refuse to accept gas having the excess water content, it is frequently necessary to use the more expensive dry desiccant method of treating the natural gas stream.

By this invention there is provided a method and system for treating a gas stream with liquid absorbent which will remove substantially more water from a gas stream and permit use of a liquid absorbent under conditions where it has not been heretofore usable. Water dewpoint depression approaching twice the obtainable with conventional reboilers is possible. The efficiency of the absorbent system is improved by increasing the percentage of reconcentration of the absorbent. This increase is provided by intimately contacting the liquid absorbent after it leaves the reboiler of the conventional system with a small amount of dry gas in the presence of a partial vacuum. The vacuum alone serves to remove water from the glycol and in combination with the dry gas contacting the glycol, the glycol is reconcentrated to a point where there is less water than by any of the prior art systems.

SUMMARY OF THE INVENTION

It is an object of this invention to provide a method and system of drying gas with a liquid absorbent which will dry the gas to a greater degree than is possible with the conventional reboiler glycol systems previously used.

Another object is to provide method and system of drying gas with a liquid absorbent in which the dewpoint depression of the gas stream under a given set of conditions can be depressed further than is possible with conventional liquid absorbent systems, resulting in a drier gas.

Another object is to provide a method and system for reconcentrating liquid absorbent in which the absorbent can be reconcentrated to a much higher percentage than is possible with conventional reconcentration systems now in use.

Another object is to provide a method and system of reconcentrating a glycol absorbent in which it is possible to obtain a reconcentration by weight of 99.5% to 99.8% purity as compared to the figure of 98.1% which is approximately the maximum percentage obtainable with use of conventional reconcentration equipment when operating below the decomposition temperature for glycol.

Another object is to provide a method and system for treating an absorbent leaving a reboiler to further evaporize solute and increase the concentration of absorbent.

Another object is to provide a system for reconcentrating glycol in which the lean glycol after leaving the reboiler is simultaneously exposed to vacuum and to the counterflow of a dry gas, both of which are effective in removing additional water from the glycol.

These and other objects are realized and the limitations of the prior art are overcome by the use of a flash chamber into which the hot clean glycol is introduced from the reboiler and into the bottom of which is introduced a flow of dry gas and to the interior of which is exposed a pressure of the order of 200 millimeters of mercury absolute. The combination of vacuum and gas stripping serves to remove more additional water than is possible in the prior art systems.

BRIEF DESCRIPTION OF THE DRAWING

These and other objects of this invention and a better understanding of the principles and details of the invention will be evident from the following description, taken in conjunction with the appended drawing in which is shown a glycol regeneration system employing a reboiler, a flash chamber and a heat exchanger.

DESCRIPTION OF THE PREFERRED EMBODIMENT

This invention relates to a system for reconcentrating a liquid desiccant such as glycol with heat, vacuum and controlled gas stripping, using air or carbon dioxide or any dry gas as the stripping gas.

Reconcentrators built at the present time utilize heat only, heat and vacuum or heat and stripping gas. A glycol reconcentrator, using heat only can achieve a concentration of 99.1 percent using a reboiler temperature of 400° Fahrenheit. Using this temperature reboiler and an absolute pressure of 200 millimeters of mercury, a concentration of 99.5 percent can be obtained. Using 400° reboiler temperature and six cubic feet of dry stripping gas per gallon of glycol a concentration of 99.7 percent can be achieved. Using an absolute pressure of 200 millimeters of mercury and six cubic feet of air, to strip the glycol a concentration of 99.8 percent can be obtained.

In addition to the above advantage of higher concentration and the increasing dewpoint depression that accompanies it, there is the tremendous savings in cost of stripping gas.

Although dry air can be used as a stripping gas it may be desirable to use the flue gas taken from the base of the reboiler stack which comprises mainly carbon dioxide and use this as a stripping gas since it is more acceptable from a safety standpoint.

Referring now to the drawing the numeral 10 indicates generally a reboiler which can be of more or less conventional design. Numeral 14 indicates a flash chamber and numeral 12 indicates a heat exchanger in an accumulator vessel 20, which will be subsequently described.

Water-rich glycol enters the system through line 16 and passes into the heat exchanger 12 to be heated up by the counterflow of the water-lean, or lean glycol. The heated rich glycol goes by line 18 to a venturi eductor 22. At the throat of the venturi where the pressure is reduced a line 24 carrying the partial vacuum is connected through heat exchanger 26, to the flash chamber 28. The arrow 19 indicates schematically the cooling liquid which is obtained from line 18 and returned to line 16.

The rich glycol passes through the venturi eductor 22 and goes by line 78 to a stripper tower 80 of the reboiler 10. The stripper tower 80 is closed by an end wall 81, with a means 82 for the passage outward of water vapor removed from the glycol in the reboiler.

The entering rich glycol drops down into the reboiler which is heated by a fire tube 71. There is a gas burner 77 that produces a flame which heats the fire tube, and by heat transfer heats the glycol to a temperature of the order of 400°. This is below the temperature at which glycol disintegrates, but is high enough to drive off the major portion of the water absorbed in the glycol. The elements 74 and 72 form a float valve for controlling the level of the lean glycol in the space 86. The fire box 73 has a stack 75 for the venting of the products of gas combustion.

The description so far of the reboiler is quite general and many of the conventional reboilers including the one shown in U.S. Pat. No. 3,397,731, could be used in the application. As the glycol is heated and the water driven off the glycol moves to the left and passes over the weir formed by partition 85 into a portion of the reboiler where the glycol indicated by 86 is the leanest of any inside the reboiler. The float means 74 controls means 72 which controls valve 70 in line 68 which takes lean, hot glycol from the chamber 86 through valve 70 and through pipe 76 which intrudes into the portion 84 of the reboiler, so that the hot glycol leaving by conduit 34 is at the temperature of the main body of glycol in the reboiler.

With most of its water removed, the hot, lean glycol goes by pipe 34 to the flash chamber 28 in which glycol 30 stands at a selected level 31. The vacuum drawn by the eductor 22 and pipe 24 causes the water vapor to flash from the hot glycol in the stream 36 as it flows into the flash chamber. At the same time the glycol 30 in the bottom portion of the chamber is submitted to physical contact by the uprising bubbles of hot dry gas 32 which are forced into the chamber through pipe 46 and perforated sparger pipe 47. The gas and water vapor pass out of the flash chamber through pipe 25 into the heat exchanger 26 and into the eductor 22 through pipe 24.

Dry gas, such as air, is introduced through pipe 40 into a flow meter 42 and out through pipe 44 where it passes into the accumulator vessel 20 where it is heated by exchanger with fluid therein, and out through valve 50, and through pipe 46 into the flash chamber. The hot dry gas bubbles 32 moving up through the lean glycol 30, in combination with the vacuum, serves to remove additional water from the glycol. The gas and vacuum stripped glycol passes down through pipe 52 and pipe 48 through control valve 54 into the accumulator vessel or heat exchanger 20 and is indicated by the numeral 60. Here the hot lean glycol, stripped by vacuum and gas, is cooled by the entering stream of rich glycol, and passes out through pipe 62 and pump 64 as stream 66 to re-enter the desiccant gas contactor vessel.

While any dry gas can be used in the flash chamber, such as air, for example, it may be convenient to use the gas obtained from the bottom of the stack 75. In such a case a pipe 88 (shown dashed) leaving the stack 75 enters an air-cooled condenser 92, where the water vapor in the flue gas is condensed, and is dropped out in a separator 90. The cooled dry gas then goes on through the heat exchanger meter 42 and through valve 50 to the flash chamber. Since the gas supplied through pipe 88 is largely carbon dioxide it is safer to use than air.

While the reboiler and the heat exchanger are common elements of prior art systems, the additional improvements of this invention lies in subjecting the hot lean glycol to a further processing by simultaneous application of vacuum and scrubbing contact with a hot dry gas in a flash chamber.

While the invention has been described with a certain degree of particularity it is manifest that many changes may be made in the details of construction and the arrangement of components. It is understood that the invention is not to be limited to the specific embodiments

What is claimed is:

1. Apparatus for the reconcentration of a relatively cool liquid absorbent that is rich with solute acquired in the process of drying a stream of gas comprising:
   a. reboiler means into which the rich absorbent stream is introduced and including means to heat said absorbent to a temperature below its point of disintegration;
   b. means to remove from the reboiler water vapor and gas which is released from the absorbent;
   c. a flash chamber separated from said reboiler including: means to apply vacuum at the top end thereof, means to introduce dry hot gas into said chamber near the base thereof, means to introduce the hot lean absorbent into said chamber, and means to remove the reconcentrated absorbent from the bottom of said flash chamber, said relatively cool water-rich absorbent being heated by indirect heat exchange with hot reconcentrated absorbent and said vacuum being generated by the flow of the preheated water-rich absorbent stream thru a venturi eductor prior to passing into said reboiler, the throat of said venturi being connected to the vapor space of said flash chamber.

2. The system as in claim 1 including means to condense the condensible vapors evolved from said flash chamber by indirect and direct heat exchange with the pre-heated water-rich glycol stream before entering said eductor.

3. In a method of reconcentrating liquid desiccant used in a fluid dehydration contactor including:
   partially reconcentrating said desiccant utilizing an indirect source of heat in a reboiler;
   controllably trapping and removing a separate stream of said partially reconcentrated desiccant from said reboiler;
   conveying said stream to a flash chamber via a conduit which is in heat exchange with the desiccant adjacent the source of said heat in said reboiler;
   inducing a vacuum in said flash chamber to further reconcentrate and desiccant stream; and
   removing said further concentrated desiccant stream from said flash chamber for use in said dehydration contactor, the improvement comprising:
   introducing into the bottom of said flash chamber a flow of hot dry gas so as to be in countercurrent contact with said desiccant therein.

4. The system as in claim 3 in which said dry gas is flue gas.

5. The system as in claim 3 in which said dry gas is air.

6. In an apparatus for reconcentrating liquid desiccant used in a fluid dehydration contactor, such as glycol, comprising in combination:
   a reboiler to create partially reconcentrated desiccant and including an indirect source of heat;
   a float operated valve to trap and remove a portion of said partially reconcentrated desiccant and to maintain a substantially constant level of desiccant within said reboiler;
   a flash separation chamber separated from said reboiler;
   conduit means to convey said portion of said partially reconcentrated desiccant from the outlet of said float operated valve thence back into said reboiler adjacent the source of heat for indirect heat exchange with the remaining partially reconcentrated desiccant therein, thence to said flash chamber to make a higher reconcentrated desiccant;
   means to induce a vacuum in said flash chamber; and
   means to flow said higher reconcentration desiccant from said flash chamber to, eventually, said gas dehydration contacting tower, the improvement comprising:
   means to introduce into said flash chamber a flow of hot dry gas into countercurrent contact with said desiccant therein.

* * * * *